(12) United States Patent
Tan et al.

(10) Patent No.: US 7,287,246 B2
(45) Date of Patent: Oct. 23, 2007

(54) DEBUGGING OPTIMIZED FLOWS WITH BREAKPOINTS USING STORED BREAKPOINT TRIGGER INDICATORS

(75) Inventors: Shu Xia Tan, Toronto (CA); Evangelos Mamas, Toronto (CA); William Gerald O'Farrell, Markham (CA); Alexander Seeleman, II, Thornhill (CA); Vivian Mak, Scharborough (CA)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 10/682,390

(22) Filed: Oct. 9, 2003

(65) Prior Publication Data

US 2004/0268185 A1 Dec. 30, 2004

(30) Foreign Application Priority Data

Jun. 20, 2003 (CA) .................................... 2432866

(51) Int. Cl.
*G06F 9/44* (2006.01)
(52) U.S. Cl. ........................................ 717/129; 717/157
(58) Field of Classification Search ................ 717/124, 717/129, 161, 157, 158, 153
See application file for complete search history.

(56) References Cited

U.S. PATENT DOCUMENTS

| | | | | |
|---|---|---|---|---|
| 5,179,702 A | * | 1/1993 | Spix et al. ................... | 718/102 |
| 5,187,789 A | * | 2/1993 | O'Hair .......................... | 707/4 |
| 5,732,210 A | * | 3/1998 | Buzbee ......................... | 714/38 |
| 6,014,515 A | * | 1/2000 | Burch .......................... | 717/129 |
| 6,091,896 A | * | 7/2000 | Curreri et al. ............... | 717/125 |
| RE36,852 E | | 9/2000 | Heinen, Jr. | |
| 6,118,448 A | | 9/2000 | McMillan et al. | |
| 6,195,676 B1 | * | 2/2001 | Spix et al. ................... | 718/107 |
| 6,256,777 B1 | * | 7/2001 | Ackerman .................... | 717/129 |
| 6,263,489 B1 | * | 7/2001 | Olsen et al. ................. | 717/129 |
| 6,324,683 B1 | | 11/2001 | Fuh et al. | |

(Continued)

OTHER PUBLICATIONS

"Compiler Transformations for High Performance Computing", David F. Bacon et al, ACM, Dec. 1994, pp. 345-419.*

(Continued)

*Primary Examiner*—Todd Ingberg
(74) *Attorney, Agent, or Firm*—Volel Emile; Herman Rodriguez

(57) ABSTRACT

In a development environment for message flows, a user defined flow may be processed into a more efficient optimized flow. However, debugging execution of the optimized flow may be confusing to the user where a correspondence between connections in the optimized flow and connections in the user defined flow are not direct. To mitigate this confusion, a connections mapping table is generated along with the optimized flow. The deploy document received by the runtime may include enough information to recreate the connections mapping table such that during debugging of the optimized flow, the user may follow the user defined flow. The use of a stack at the runtime allows a debugger to maintain awareness of previous pauses in execution caused by the placement of breakpoints on connections in the user defined flow while directing the runtime through execution of the optimized flow.

14 Claims, 11 Drawing Sheets

U.S. PATENT DOCUMENTS

| | | | |
|---|---|---|---|
| 6,412,106 | B1 | 6/2002 | Leask et al. |
| 6,427,232 | B1 | 7/2002 | Ku et al. |
| 6,434,741 | B1 * | 8/2002 | Mirani et al. ............... 717/124 |
| 6,553,565 | B2 * | 4/2003 | Click, Jr. et al. ........... 717/129 |
| 6,678,884 | B1 * | 1/2004 | Kesselman et al. ......... 717/129 |
| 6,728,954 | B1 * | 4/2004 | Kesselman et al. ......... 717/154 |
| 6,851,110 | B2 * | 2/2005 | Hundt et al. ................. 717/159 |
| 6,892,325 | B2 * | 5/2005 | Bates et al. ................... 714/38 |
| 6,934,937 | B1 * | 8/2005 | Johnson et al. ............. 717/129 |
| 6,934,943 | B2 * | 8/2005 | Hundt et al. ................. 717/159 |
| 6,981,248 | B2 * | 12/2005 | Bates et al. ................. 717/129 |
| 7,086,033 | B2 * | 8/2006 | Bates et al. ................. 717/124 |
| 2002/0120919 | A1 | 8/2002 | Aizenbud-Reshef et al. |
| 2002/0188930 | A1 | 12/2002 | Moser et al. |
| 2003/0009548 | A1 | 1/2003 | Poynor |
| 2003/0023955 | A1 | 1/2003 | Bates et al. |
| 2003/0028858 | A1 | 2/2003 | Hines |
| 2003/0041315 | A1 | 2/2003 | Bates et al. |

OTHER PUBLICATIONS

"Precise Interprocedureal Dataflow Analysis via Graph Reachability", Thomas Reps et al, ACM, 1995, pp. 49-61.*

"Demand Interprocedural Dataflow Analysis", Susan Horwitz et al, ACM, 1995, pp. 104-115.*

"Debugging Optimized Code with Dynamic Deoptimization", Urs Hoizle et al, ACM, 1992, pp. 32-43.*

"Debugging Optimized Code Without Being Misled: Currency Determination", Max Copperman, UCSC-CRL-93-24, 1993, pp. 1-51.*

"Symbolic Debugging of Optimized Code", John Hennessy, ACM, 1982, pp. 323-344.*

How Debuggers Work, J.B. Rosenberg, 1996, whole manual.*

Regular Expression Pattern Matching for XML, Haruo Hosoya et al, ACM, Jan. 2001, pp. 67-80.*

Takeshi Ogasawara, "Method and Apparatus for Displaying the Call Stack of Optimized Programs in Diagnostic or Debugging Tools", RD n443 Mar. 2001, Article 132, p. 469.

Tang M. Min, "Enable Debuggers as an Objective Performance Measurement Tool for Software Development Cost Reduction", RD n444 Apr. 2001, Article 188, pp. 686-688.

Besaw, K.; Donnovan, RJ.; "Monotonically Increasing Counter for Local Code Optimization Algorithm", TDB v36 n 12 Dec. 1993, pp. 663-668.

"WebLogic Server 6.1 API Reference: Interface JDBCConnectionPoolMBean" BEA System, Inc., 2001.

Ma, Z.J.; Deng, L.; A Path-Stack Algorithm for Optimizing Dynamic Regimes in a Statistical Hidden Dynamic Model of Speech.

* cited by examiner

| PHYSICAL CONNECTION | LOGICAL CONNECTIONS |
|---|---|
| 321 | 121 |
| 322 | 122, 123, AND 124 |
| 323 | 125, 126, AND 127 |
| 324 | 122, 128, AND 129 |
| 325 | 130, 131, AND 127 |

FIG. 4

```
<PhysicalConnection sourceNode = id of source node
    sourceTerminal = terminal name
    targetNode = id of target node
    targetTerminal = terminal name >
    <!-- list of contained logical connections in order -->
    <LogicalConnection .../>
    <LogicalConnection .../>
</PhysicalConnection>
```

FIG. 5

```
<LogicalConnection sourceNode = id of source node
    sourceTerminal = terminal name
    targetNode = id of target node
    targetTerminal = terminal name
    order = order of this logical connection/>
```

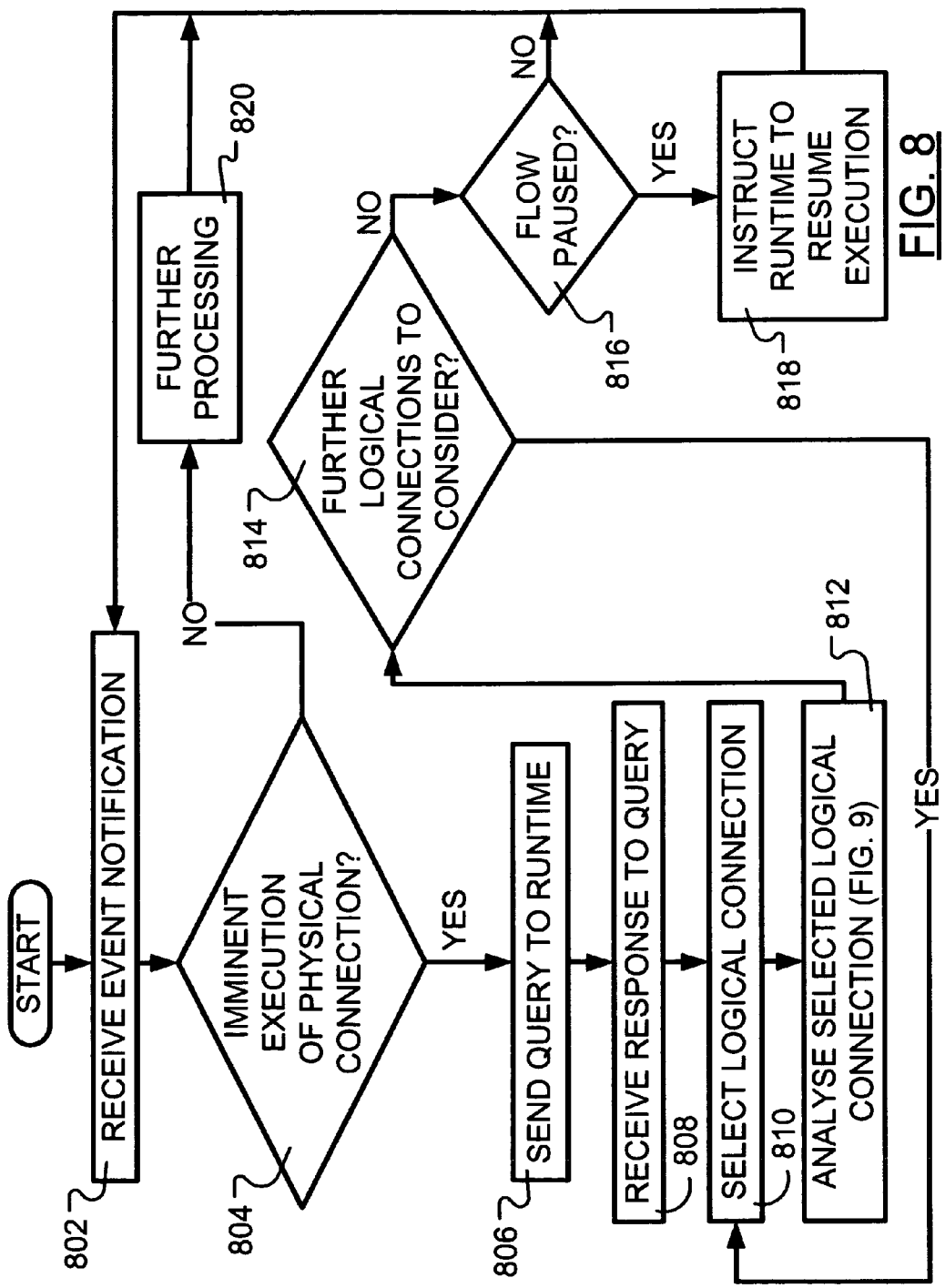

DEBUGGING OPTIMIZED FLOWS WITH BREAKPOINTS USING STORED BREAKPOINT TRIGGER INDICATORS

FIELD OF THE INVENTION

The present invention relates to debugging program flows and, in particular, debugging optimized program flows.

BACKGROUND OF THE INVENTION

It has become commonplace, of late, for software developers to employ programming tools when developing program code. Such tools may include environments for efficiently writing (an editor), compiling (a compiler), executing (a runtime) and debugging the execution of (a debugger) program code. It is well accepted that program may be referred to in terms of a program "flow" that is representative of components of a whole that is a program, or a part thereof. The components are typically lines of code set apart from other lines of code based on the purposed served. The components may be seen as "nodes" in a flow map, which may also be called a flow graph or flow chart. Between the nodes may be "connections" that indicate the nodes that follow other nodes in the flow.

Debugging code often requires that breakpoints be placed in the code by the developer so that, when the code is compiled and executed, the execution pauses at the breakpoint. While execution of the code is paused, the developer may, for instance, review the values of certain variables or determine that a lock has been obtained on given object. Once the developer has reviewed the available information for the breakpoint, a command may be given so that execution may continue, at least until execution pauses at the next breakpoint.

When lines of program code prepared by a software developer are executed in a runtime, it may be that the code has been optimized (by the compiler, alternatively called "deploy tooling") so that, when executed, the program runs more efficiently than would have been the case if executed precisely as written. Compilers that optimize code may scan through the code and use a set of use logical rules to determine where efficiencies may be found through the elimination of various instructions and, often, the introduction of some new instructions to compensate for some of the eliminated instructions.

When a flow is optimized, nodes and connections in that flow may be repositioned and reorganized such that the flow is more efficient. As a result, it may be considered that there are two types of flow: a user defined flow, which is developed in the tooling (the writing environment); and an optimized flow, which is used in the runtime (the execution environment). Because of this rearrangement, a flow debugger cannot always identify a connection in the optimized flow that corresponds to a given connection in the user defined flow. Consequently, where the user (software developer) has placed a breakpoint on the given connection between nodes in the user defined flow, this breakpoint may not map well to a particular connection in the optimized flow. As such, it may not be clear to the debugger precisely where to place corresponding breakpoint in the optimized flow, i.e., where to pause execution.

One solution to this problem is to avoid optimization while debugging. That is, rather than producing an optimized flow, the user defined flow is compiled to produces a special "debuggable" version of the user defined flow for execution. The developer may then use the results of the execution of the debuggable version of the flow to find errors and inconsistencies. However, by doing so, the developer is not debugging a "true" (optimized) version of the executable code that will be run in a finished product.

SUMMARY OF THE INVENTION

Through the use of mapping of flow connections and maintenance of information about connections on which breakpoints have been placed and acted upon, an optimized flow corresponding to a user defined flow may be executed for debugging. The connection information maintenance may be seen to allow for a debugger user interface that is notable for clarity and minimization of confusion of the user.

In accordance with an aspect of the present invention there is provided a method of generating a deploy document describing an optimized flow that corresponds to a user defined flow. The method includes creating a connections mapping table wherein a connection in the optimized flow is associated with at least one connection in the user defined flow. In other aspects of the present invention, a compiler is provided for performing this method and a computer readable medium is provided to allow a general purpose computer to perform this method.

In accordance with another aspect of the present invention there is provided a method of executing an optimized flow that is derived from a user defined flow, each of the optimized flow and the user defined flow comprising a plurality of nodes connected by a plurality of connections. The method includes constructing a stack associated with a terminal of a given node of the plurality of nodes in the optimized flow, the terminal connecting to a given optimized flow connection of the plurality of connections in the optimized flow, where the given bale rollers connection is associated with at least one user flow connection of the plurality of connections in the user defined flow, reporting imminent execution of the given optimized flow connection, receiving an instruction to push an indication of a particular user flow connection, among the at least one connection associated with the given optimized flow connection, into the stack and, responsive to receiving the instruction to push, pushing the indication of the particular user flow connection into the stack. In other aspects of the present invention, a runtime is provided for performing this method and a computer readable medium is provided to allow a general purpose computer to perform this method.

In accordance with a further aspect of the present invention there is provided a method of controlling a runtime for debugging a user defined flow that has been compiled into an optimized flow, each of the optimized flow and the user defined flow comprising a plurality of nodes connected by a plurality of connections. The method includes receiving a report, from the runtime, of imminent execution of a given optimized flow connection of the plurality of connections in the optimized flow, querying the runtime to identify at least one user flow connection of the plurality of connections in the user defined flow associated with the given optimized flow connection, determining whether a breakpoint has been placed on a first user flow connection of the at least one user flow connections in the user defined flow, responsive to determining a breakpoint has been placed on the first user flow connection, determining whether an indication of the first user flow connection exists in a stack associated with a terminal of a given node of the plurality of nodes in the optimized flow, the terminal connecting to the given optimized flow connection and, responsive to determining the indication does not exist in the stack, instructing the runtime to push an indication of the first user flow connection into the stack. In other aspects of the present invention, a debugger is provided for performing this method and a computer readable medium is provided to allow a general purpose computer to perform this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 4 illustrates a connections mapping table according to an embodiment of the present invention;

FIG. 5 illustrates an XML element for physical connections according to an embodiment of the present invention;

FIG. 6 illustrates an XML element for logical connections according to an embodiment of the present invention;

FIG. 8 illustrates steps of a debugging method according to an embodiment of the present invention;

DETAILED DESCRIPTION

Figure 1:
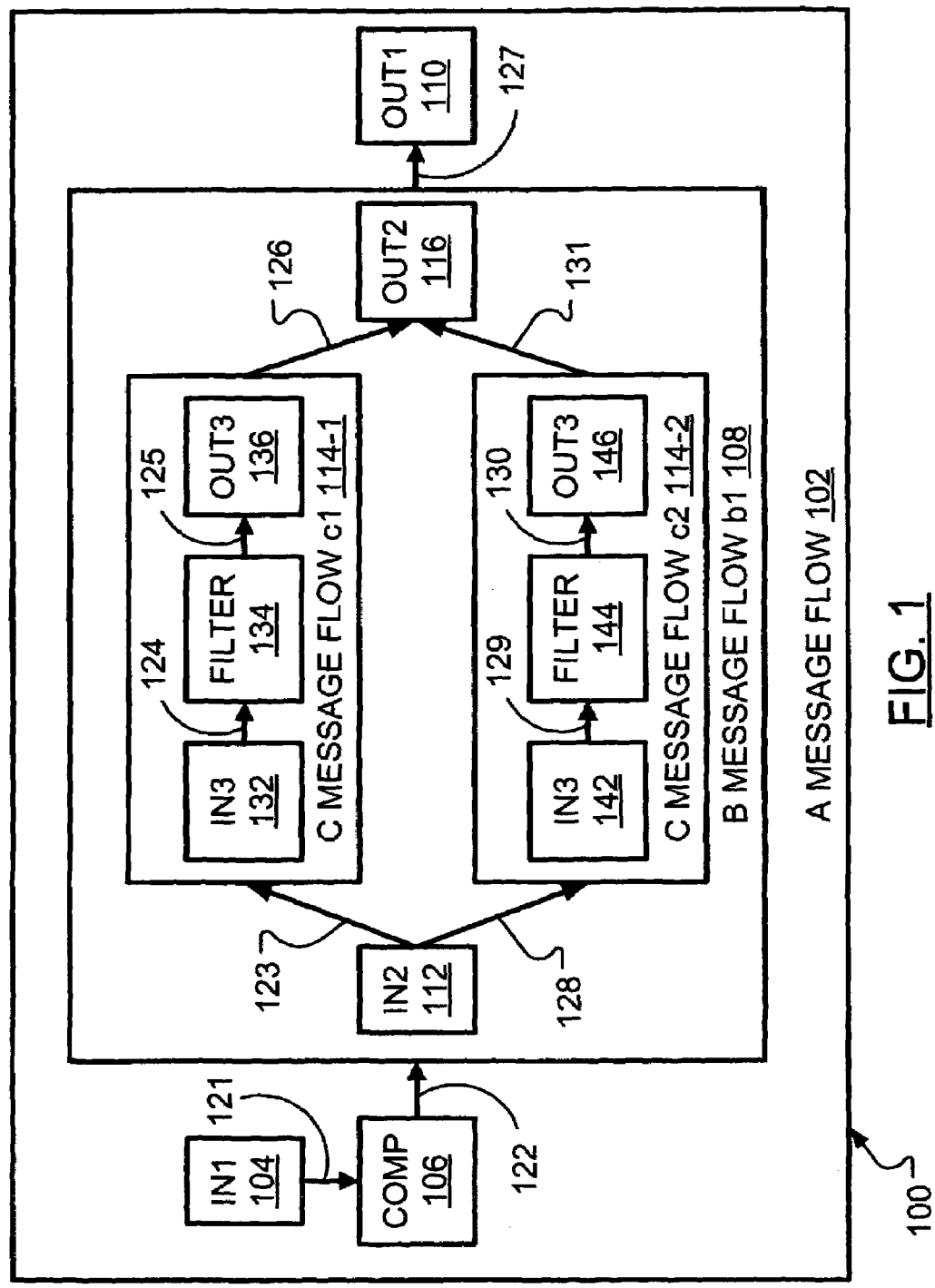
FIG. 1 illustrates an exemplary user defined flow.

FIG. 1 illustrates an exemplary user defined flow 100. The user defined flow 100 includes an "A" nested message flow 102, which contains an instance of a "B" message flow b1 108, which contains two instances of a "C" message flow, namely c1 114-1 and c2 114-2. By way of distinction of terminology, a connection in a user defined flow may be called a "logical" connection while a connection in an optimized flow (to be illustrated hereinafter) may be called a "physical" connection. Each logical connection between nodes in the exemplary user defined flow 100 is labeled. An input node In1 104 receives a message and passes the message, over a logical connection 121, to a comp node 106. After processing the message, the comp node 106 passes the message, over a logical connection 122, to the "B" message flow b1 108. After processing the message, the "B" message flow b1 108 passes the message, over a logical connection 127, to an output node Out1 110, which stores the message.

Within the "B" message flow b1 108, an input node In2 112 receives the message and passes the message to one of the instances 114-1, 114-2 of the "C" message flow, over a respective logical connection 123, 128. The message is then passed over a respective logical connection 126, 131, to an output node Out2 116 for sending on to the next node.

Within the first instance, c1 114-1, of the "C" message flow, a first input node In3 132 receives the message and passes the message, over a logical connection 124, to a first filter 134. The message is then passed, over a logical connection 125, from the first filter 134 to a first output node Out3 136 for sending on to the next node. Similarly, within the second instance, c2 114-2, of the "C" message flow, a second input node In3 142 receives the message and passes the message, over a logical connection 129, to a second filter 144. The message is then passed, over a logical connection 130, from the second filter 144 to a second output node Out3 146 for sending on to the next node.

Figure 2:
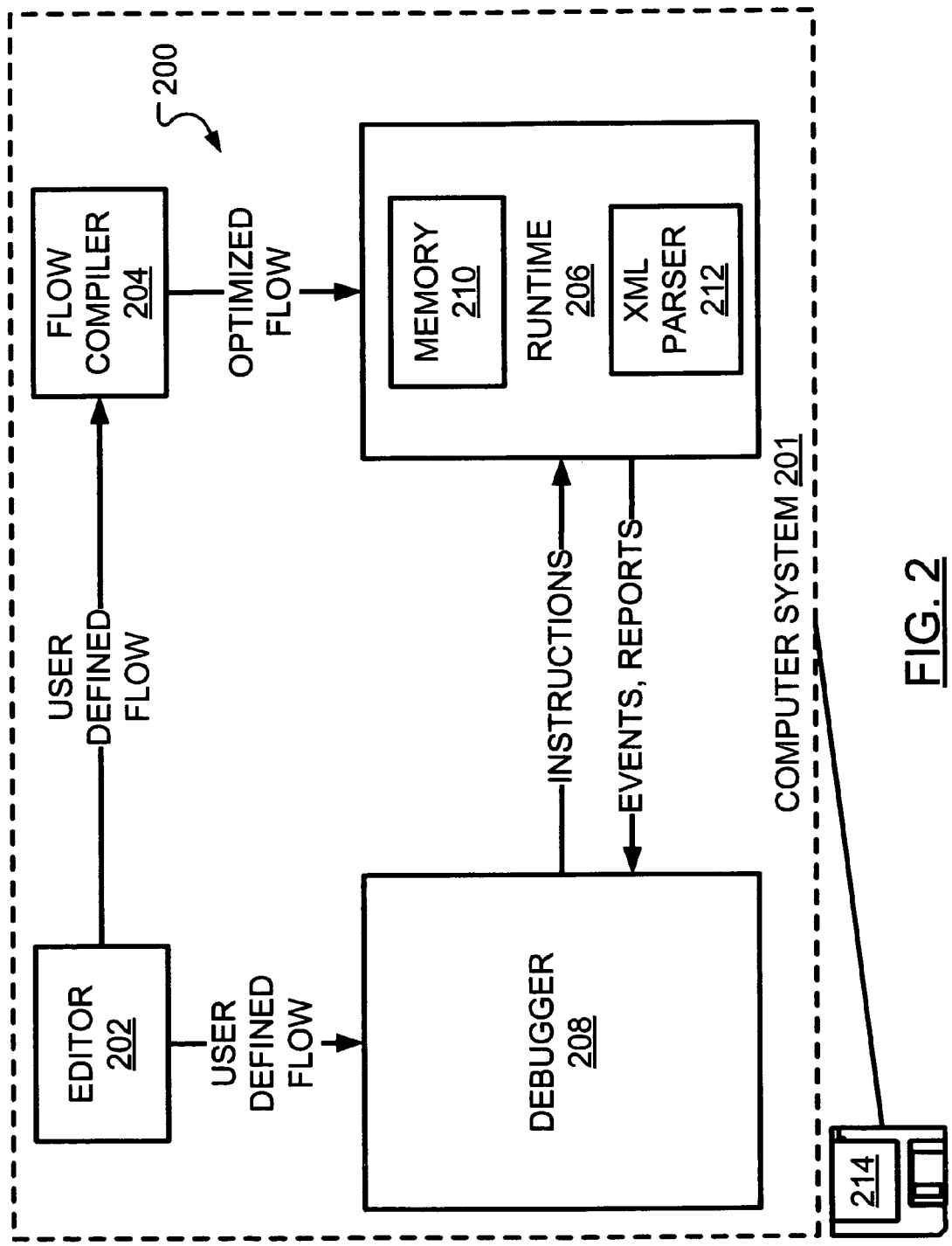
FIG. 2 illustrates a logical representation of communication between various components of a program development environment according to an embodiment of the present invention.

FIG. 2 illustrates a logical representation of communication between various components of a program development environment 200. The program development environment 200 includes an editor 202, a compiler 204, a runtime 206 and a debugger 208. It should be well understood that such a program development environment 200 is implemented on a computer system 201 that includes typical components, such as a processor (not shown), memory and user interface components (keyboard, mouse, display, not shown). The computer system 201 may be loaded with methods exemplary of this invention from a software medium 212 which could be a disk, a tape, a chip or a random access memory containing a file downloaded from a remote source. The editor 202 may supply a user defined flow to the compiler 204 and the debugger 208. The compiler 204 may optimize the user defined flow to produce an optimized flow, which may be supplied to the runtime 206, which is illustrated as including a memory 210 and an XML parser 212. While executing the optimized flow for debugging purposes, the runtime 206 is generally required to establish bidirectional communication with the debugger 208. In particular, the runtime 206 reports on events in the progression through the optimized flow and the debugger 208 provides information and instructions (pause execution, resume execution).

Figure 3:
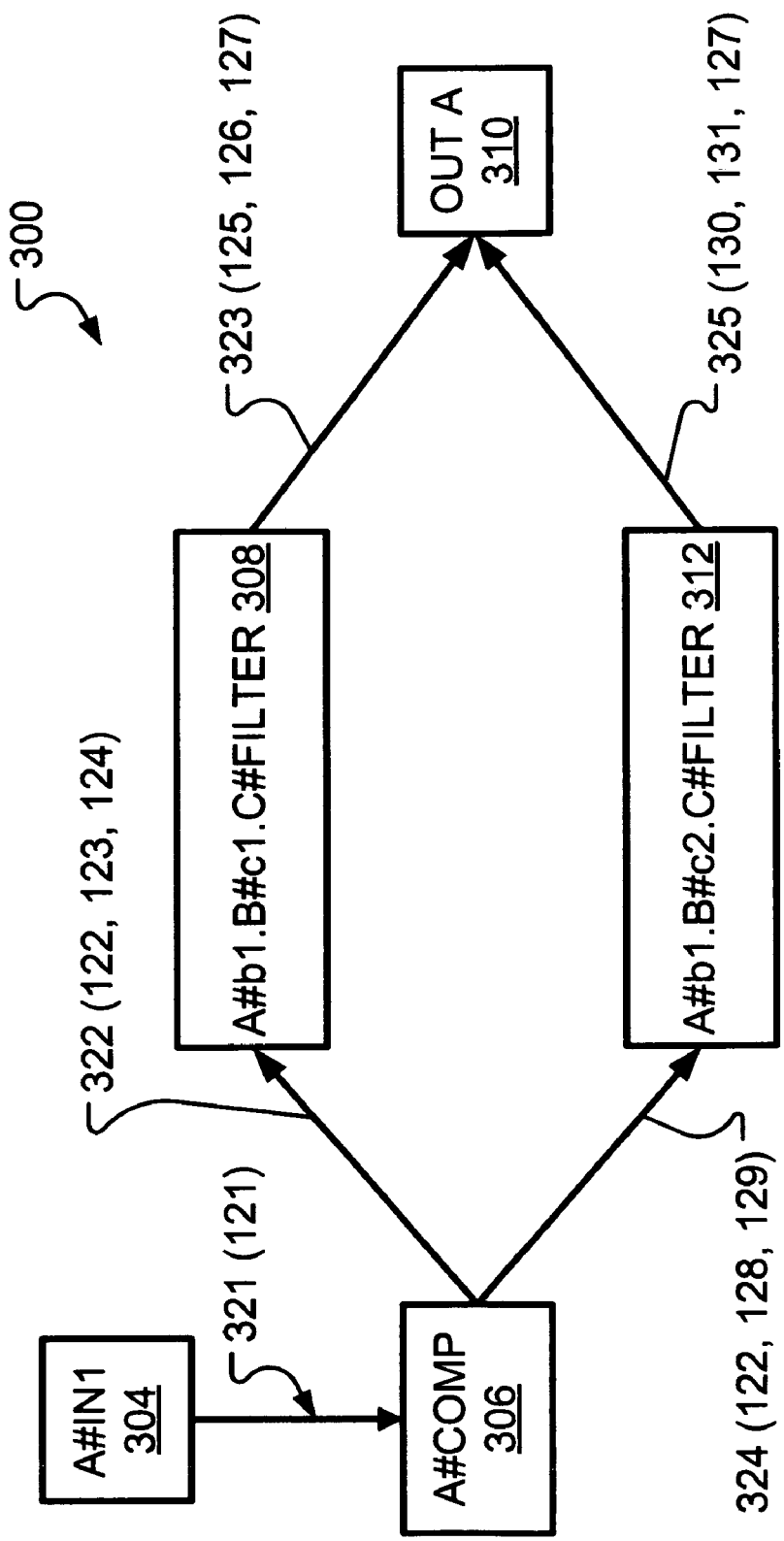
FIG. 3 illustrates an exemplary optimized flow corresponding to the exemplary user defined flow of FIG. 1.

An exemplary optimized flow 300 is illustrated in FIG. 3 corresponding to the exemplary user defined flow 100 of FIG. 1. Physical connections between nodes in the optimized flow 300 may be considered to connect to the nodes at a "terminal". In the exemplary optimized flow 300, a physical connection 321 connects a source terminal at an input node A#In1 304 to a target terminal at a comp node A#comp 306. Further, a physical connection 322 connects a source terminal at the comp node A#comp 306 to a target terminal at a filter node A#b1.B#c1.C#filter 308. Additionally, a physical connection 324 connects a source terminal at the comp node A#comp 306 to a target terminal at a filter node A#b1.B#c2.C#filter 312. A physical connection 323 connects a source terminal at the filter node A#b1.B#c1.C#filter 308 to a target terminal at an output node 310. Similarly, a physical connection 325 connects a source terminal at the filter node A#b1.B#c2.C#filter 312 to a target terminal at the output node 310.

In overview, there is often a requirement (say, due to a breakpoint) that the debugger 208 map a logical connection in the user defined flow 100 to a physical connection in the optimized flow 300. The compiler 204 typically provides the runtime 206 with a "deploy" document containing a representation of the optimized flow. The runtime may use the deploy document to construct the optimized flow for execution. It is proposed herein to provide, within the deploy document, additional information regarding the correspondence between physical connections in the optimized flow to logical connections in the user defined flow. In particular, each logical connection and physical connection may be identified by a connection identifier (ID) and a connections mapping table may be used to maintain a mapping of logical connections to physical connections. The compiling of the user defined flow into the optimized flow by the compiler 204 may result in the connections mapping table, an exemplary one of which is generally indicated as 400 in FIG. 4. Once the connections mapping table 400 is determined, the deploy document that represents the optimized flow may be amended to provide additional information such that, upon receipt of the deploy document, the runtime 206 may recreate the connections mapping table 400. The connections mapping table 400 may then be loaded every time the runtime initializes the optimized flow.

As is typical, during execution of the optimized flow, the runtime 206 may report to the debugger 208 the event that a particular physical connection in the optimized flow is being executed. However, according to aspects of the present invention, the debugger 208 may query the runtime 206 for the connection IDs of the logical connections that correspond to the connection ID of the physical connection being executed. The runtime 206 may then consult the connections mapping table and report back to the debugger 208 the precise logical connections. The debugger 208, given knowledge of the placement of the breakpoints on logical connections within the user defined flow, may then appropriately instruct the runtime 206 with regard to pausing, and resuming, execution of the optimized flow. As such, the progress of the execution of the optimized flow may be observed, through a user interface associated with the debugger 208, to be occurring on a node-by-node basis through the user defined flow.

As the runtime 206 may be required to load connection information for a given physical connection from the debugger 208, the runtime 206 may provide an application program interface (API) to the debugger 208. The API may include methods that allow the debugger 208 to query the runtime 206 to: determine a number of layers of logical connections; retrieve a list of logical connections at a particular level; determine the source node of a given logical connection; determine the target node of a given logical connection; determine the source terminal of a given logical connection and determine the target terminal of a given logical connection.

In one embodiment, the deploy document is produced by the compiler 204 in the "extensible Markup Language" (XML) format. In order to provide the additional information necessary for the runtime 206 to generate the connections mapping table, the XML deploy document may be arranged to contain physical connection elements and node elements. It has been discussed hereinbefore that nodes connect to physical connections at terminals. More specifically, a physical connection may be considered to connect a source terminal at a source node to a target terminal at a target node. A representation of a physical connection in the XML deploy document, an XML element for physical connections 500, is illustrated in FIG. 5. The XML element for physical connections 500 is shown to contain such XML attributes as a source node ID, a source terminal ID, a target node ID and a target terminal ID. A similarly constructed XML element for logical connections 600 is illustrated in FIG. 6. The XML element for logical connections 600 is shown to contain a source node ID, a source terminal ID, a target node ID, a target terminal ID and the order of this logical connection among all the logical connections corresponding to the same physical connection.

It is known to use an XML deploy document to transfer an optimized flow from the compiler 204 to the runtime 206. Upon receipt of the deploy document, the XML parser 212 component of the runtime 206 parses the deploy document to generate an optimized flow for execution. However, it has not been previously known to include sufficient information in the deploy document such that the runtime 206 may recreate the connections mapping table for the optimized flow. Since the XML parser is known to be able to handle nested elements, the addition of information mapping physical connections to logical connections in the XML deploy document may be shown not to impose any new functionality requirements on the XML parser 212.

In operation, when processing the user defined flow 100, the compiler 204 may consider that each flow within the user defined flow 100 may be represented as a separable graph or may consider that parts of flow can be a separable graph. Once the user defined flow 100 is divided into a set of directed "biconnected" components, each of the components may be processed in sequence. The compiler 204 may sort the logical connections connected within each biconnected component using a "depth-first" algorithm between "articulation points".

Figures 7A, 7B, 7C:
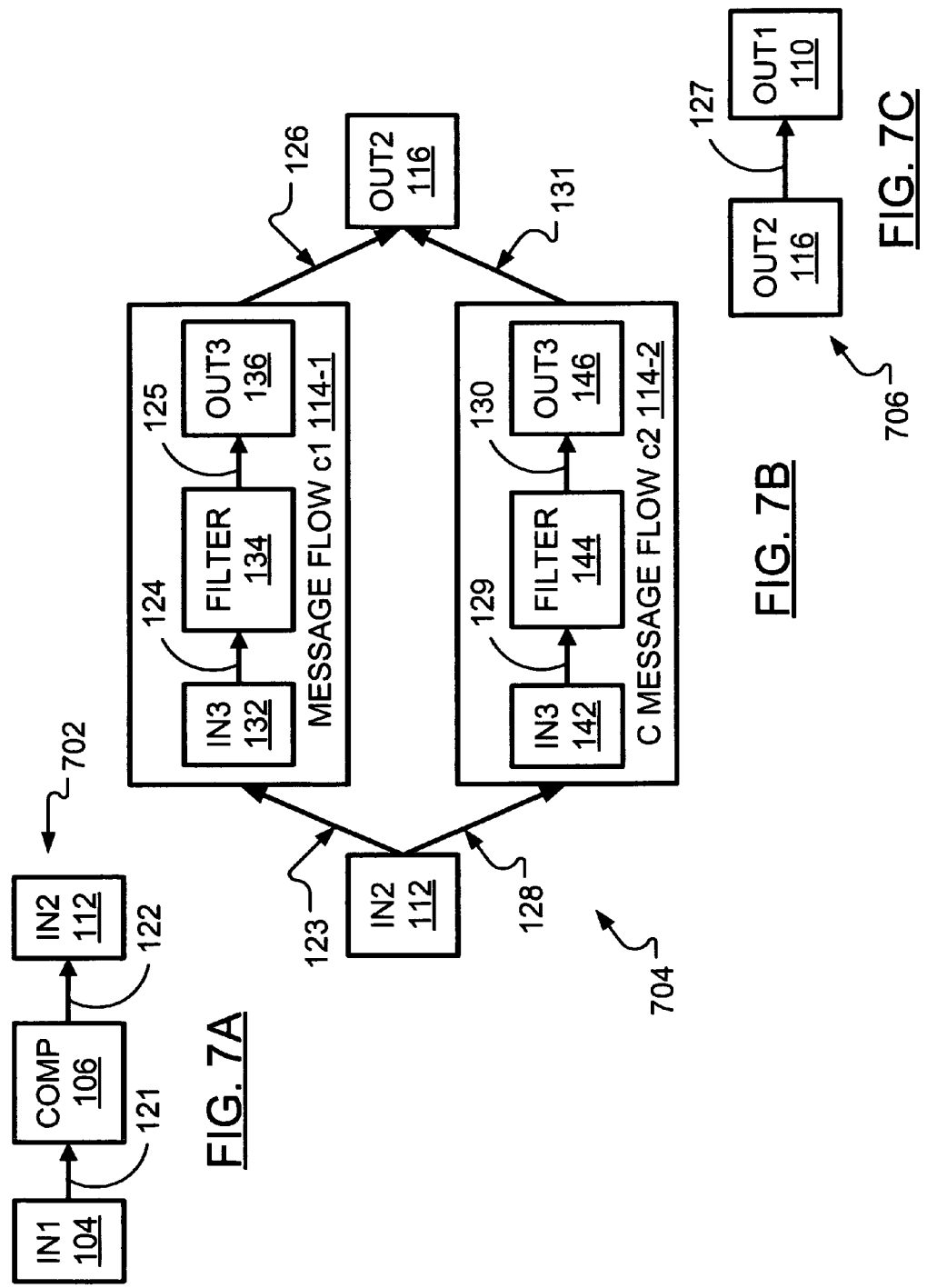
FIG. 7A illustrates a first component of the biconnected components into which the user defined flow of FIG. 1 may be separated, according to an embodiment of the present invention.
FIG. 7B illustrates a second component of the biconnected components into which the user defined flow of FIG. 1 may be separated, according to an embodiment of the present invention.
FIG. 7C illustrates a third component of the biconnected components into which the user defined flow of FIG. 1 may be separated, according to an embodiment of the present invention.

For example, the entire user defined flow 100 as illustrated in FIG. 1 may be considered to be a separable graph, i.e., a flow graph that is separable into individual components. FIG. 7A illustrates a first component 702 of the biconnected components into which the user defined flow 100 may be separated. The first component 702 includes the input node In1 104, the comp node 106 and the input node In2 112. FIG. 7B illustrates a second component 704 of the biconnected components into which the user defined flow 100 may be separated. The second component 704 includes the input node In2 112, both instances 114-1, 114-2, of the "C" message flow and the output node Out2 116. FIG. 7C illustrates a third component 706 of the biconnected components into which the user defined flow 100 may be separated. The third component 706 includes the output node Out2 116 and the output node Out1 110.

The compiler 204 may identify the input node In2 112 and the output node Out2 116 as the articulation points of the user defined flow 100 of FIG. 1. The previously referenced sorting of the logical connections using a depth-first algorithm relates, in this example, to the processing of the second component 704. In particular, the order of the logical connections that follow the logical connection 123 is determined first, then the order of the logical connections that follow the logical connection 128 is determined.

From the processing, the compiler 204 determines that the logical connections 121 and 122 will always be traversed by messages ahead of other logical connections and that the messages will always traverse the logical connection 127 last. The compiler 204 also determines that the logical connections that follow the logical connection 123 are, in order, the logical connections 124, 125 and 126 and that the logical connections that follow the logical connection 128 are, in order, the logical connections 129, 130 and 131.

The ordering of the logical connections according to order of the logical connections in the user defined flow may be seen to provide "step over" and "step into" functionality (known debug commands) to the debugger 208.

A typical candidate for optimization is a nested flow. When optimizing a nested flow portion of a given flow, it is often convenient to "flatten" the nested flow. That is, some of the logical connections in the user defined nested flow are eliminated when generating a corresponding optimized flow. When optimizing the user defined flow 100, the compiler may consider that the sub flow input nodes (the input node In2 112, the first input node In3 132, the second input node In3 142) and the sub flow output nodes (the output node Out2 116, the first output node Out3 136 and the second output node Out3 146) are so-called "passthru" nodes, which do not do anything and may be eliminated to optimize the flow.

For the execution of the optimized flow 300, there may be logic that dictates that, if there are two or more physical connections exiting from the same source terminal on a node, the execution proceeds in a depth-first manner. According to depth-first execution logic in the runtime, logical connections can be grouped, by the compiler 204, as shown in the connections mapping table 400 as illustrated in FIG. 4. The order of physical connections traversed during execution of the optimized flow 300 may be the physical connection 321 first, followed by the physical connection 322, the physical connection 323, the physical connection 324 and then the physical connection 325.

The connections mapping table may be used by the debugger 208 to decide where to instruct the runtime 206 to pause execution. However, if the connections mapping table is used directly, there may be some cases in which the user may be confused. Such cases include cases wherein a single breakpoint causes the execution to pause twice or wherein a breakpoint is placed in a loop.

Consider that a user sets breakpoints on logical connections 122, 123, 128 of the exemplary user defined flow 100 of FIG. 1. According to the connections mapping table 400 of FIG. 4, the logical connection 122 maps to the physical connection 322 and to the physical connection 324. Additionally, the logical connection 123 maps to the physical connection 322 and the logical connection 128 maps to the physical connection 324. Accordingly, the runtime 206 reports when the physical connection 322 is to be executed and, through a query to the connections mapping table 400 at the runtime 206, the debugger 208 determines that the physical connection 322 includes the logical connection 122 on which the user has placed a breakpoint. Responsive to determining that the physical connection to be executed corresponds to a logical connection on which the user has placed a breakpoint, the debugger 208 instructs the runtime 206 to pause execution.

Later, when the runtime 206 reports that the physical connection 324 is to be executed and, through a query to the connections mapping table 400 at the runtime 206, the debugger 208 determines that the physical connection 324 includes the logical connection 122 on which the user has placed a breakpoint. Responsive to determining that the physical connection to be executed corresponds to a logical connection on which the user has placed a breakpoint, the debugger 208 instructs the runtime 206 to pause execution. The breakpoint placed on the logical connection 122 has, in this scenario, caused the execution to be paused twice. This may confuse the user, who placed a breakpoint on a logical connection that appears only to be traversed once. Clearly, the optimization of the user defined flow has led to a debugging execution that is confusing to the user. In the expected scenario, the execution pauses on the logical connection 122, then pauses on the logical connection 123 and later pauses on the logical connection 128.

To achieve this expected scenario, a stack is used. Associated with each out terminal may be a single stack in which an indication of breakpoints that have caused the execution to pause may be saved. When execution of an optimized flow progresses to a given out terminal of a given node, the runtime 206 may construct a stack in the memory 210 and associate the stack with the given out terminal. Whenever the execution of the optimized flow execution returns to the given out terminal and the runtime 206 reports to the debugger 208 that a further physical connection is to be executed, the debugger 208 may instruct the runtime 206 to check the stack. If a breakpoint has been placed on a given logical connection associated with the further physical connection, it is determined whether an indication of the given logical connection is in the stack. Where an indication of the given logical connection is not in the stack, the debugger 208 may instruct the runtime 206 to "push" such an indication into the stack and pause the execution of the optimized flow. If an indication of the logical connection is already in the stack, the execution of the optimized flow may be allowed to continue without pausing.

Operation of the debugger 208 is presented as a flow diagram in FIG. 8. As mentioned hereinbefore, the runtime 206 sends event notifications to the debugger 208, so that the debugger 208 may control the execution of the optimized flow at the runtime 206. When the debugger 208 receives such a notification (step 802), it is determined whether the event is the imminent execution of a physical connection (step 804). If so, the debugger 208 sends a query (step 806) to the runtime 206 to determine which logical connections in the user defined flow are associated with the physical connection in the optimized flow that is to be executed. At the runtime 206, a response to the query from the debugger 208 is generated based on consulting the connections mapping table and sent to the debugger 208. The debugger 208 receives the response (step 808) from the runtime 206. Such a response may include an ordered list of logical connections associated with the physical connection. The debugger 208 may then consider each of the logical connections in order. A first logical connection is selected (step 810) an analyzed (step 812) for the presence of a break point. The analysis of step 812 is expanded upon in FIG. 9. Once the analysis is complete, it is determined whether there are further logical connections to consider (step 814). If further logical connections remain to be considered, the next logical connection in the ordered list is selected (step 810) and analyzed (step 812). If no further logical connections are to be considered, it is determined whether the flow is paused (step 816). If it is determined that the flow is paused, the runtime 206 is instructed to resume execution (step 818) and control returns to the receipt of event notifications from the runtime 206 (step 802). If it is determined that flow is not paused, control returns to the receipt of event notifications from the runtime 206 (step 802) without the resume instruction being sent. Additionally, if the received event notification does not relate to imminent execution of a physical connection, the debugger 208 processes the event (step 820) normally, details of which processing are excluded from the present document.

Note that, due to the possibility that several logical connections may correspond to a single physical connection, the runtime is not necessarily instructed to resume execution when a resume command is received from the user.

Figure 9:
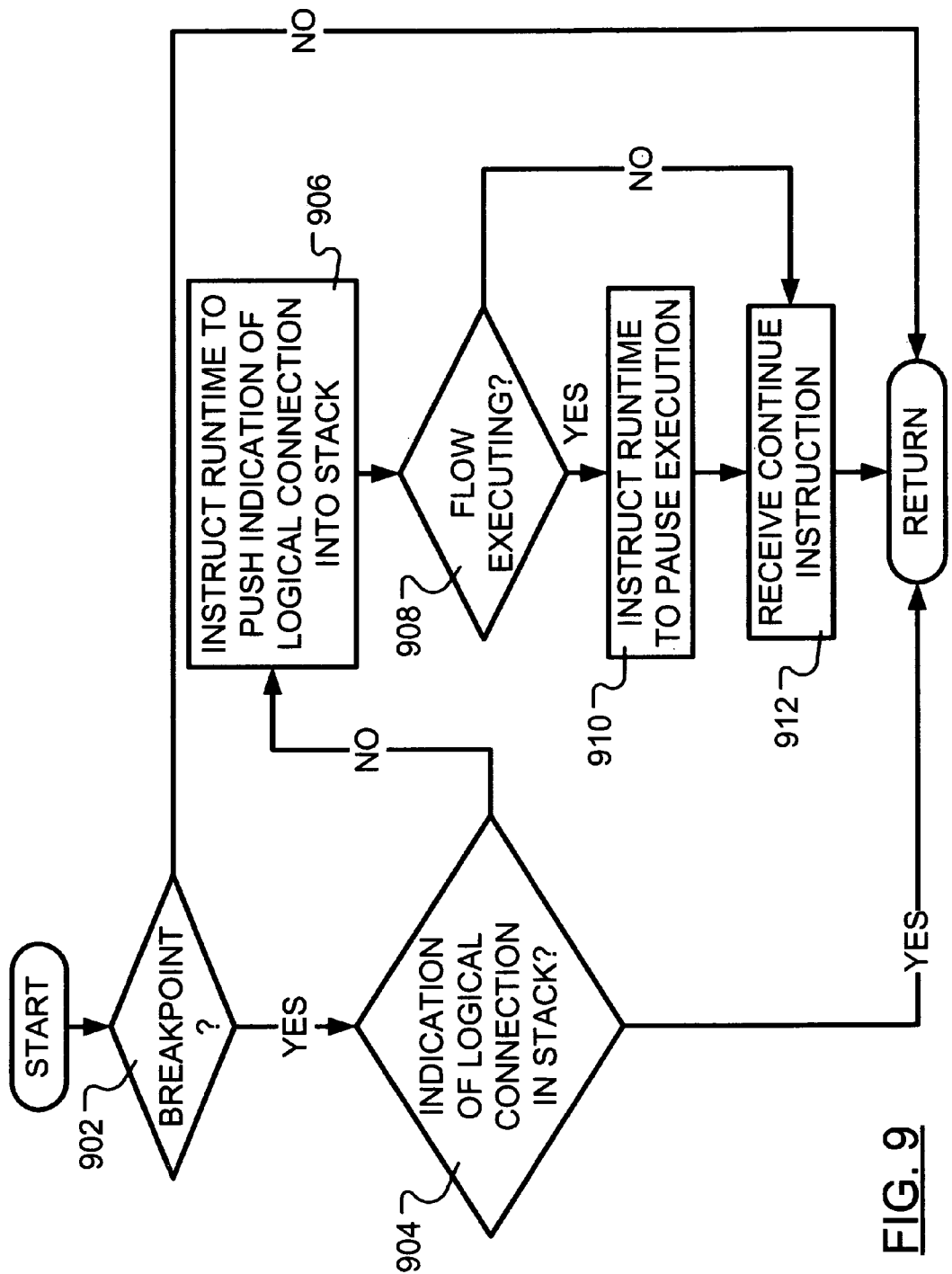
FIG. 9 illustrates steps of a logical connection analysis method, as part of the debugging method of FIG. 8, according to an embodiment of the present invention.

The steps of a logical connection analysis (step 812) are presented as a flow diagram in FIG. 9. By way of example, consider activity that may occur after execution of the node comp node A#comp 306 (FIG. 3), which has an out terminal connected with both the physical connection 322 and the physical connection 324. First of all, it may be considered that the runtime 206 has constructed a stack for the out terminal of the node comp node A#comp 306. During the execution of the optimized flow 300, when the runtime 206 reports that the physical connection 322 is to be executed, the debugger 208 communicates with the runtime 206 (see FIG. 8) to determine that the physical connection 322 is associated with the logical connection 122, the logical connection 123 and the logical connection 124.

The debugger 208 selects (step 810) the logical connection 122 and then determines (step 902) whether a breakpoint has been placed on the selected logical connection 122. It has been stated hereinbefore that a breakpoint has been placed on the logical connection 122. The debugger 208 may query the runtime 206 to determine (step 904) whether an indication of the logical connection 122 is present in the stack associated with the out terminal of the comp node A#comp 306. The runtime 206 may then check the stack and report back to the debugger 208. If it is determined (step 904) that an indication of the logical connection 122 is not present in the stack, the debugger 208 may instruct the runtime 206 to push such an indication into the stack (step 906). If it is determined (step 908) that execution is underway, the debugger 208 may instruct the runtime 206 to pause execution (step 910).

When a command is received (step 912) from the user by the debugger 208 to resume execution, the debugger 208 may select (step 810) and proceed to analyze (step 812) the logical connection 123. The debugger 208 may then recognize (step 902) that a breakpoint has been placed on the logical connection 123. The debugger 208 may query the runtime 206 to determine (step 904) whether an indication of the logical connection 123 is present in the stack associated with the out terminal of the node comp node A#comp 306. The runtime 206 may check the stack and report back to the debugger 208. If it is determined that an indication of the logical connection 123 is not present in the stack, the debugger 208 may instruct the runtime 206 to push such an indication into the stack (step 906). As it may then be determined (step 908) that execution is paused, the debugger 208 need not instruct the runtime 206 to pause execution.

When a command is received (step 912) from the user by the debugger 208 to resume execution, the debugger 208 may select (step 810) and proceed to analyze (step 812) the logical connection 124. The debugger 208 may then recognize (step 902) that a breakpoint has not been placed on the logical connection 124. Further, the debugger 208 may determine (step 814) that there are no more logical connections to consider. It is then determined that the flow is paused (step 816). Consequently, the runtime 206 is instructed to resume execution (step 818) and control returns to the receipt of event notifications from the runtime 206 (step 802). Responsive to the resume instruction, the runtime 206 executes the physical connection and thereby progresses to the filter node A#b1.B#c1.C#filter 308.

During the continued execution of the optimized flow 300, when the runtime 206 reports that the physical connection 324 is to be executed, the debugger 208 may communicate with the runtime 206 (see step 806, 808) and determine that the physical connection 324 is associated with the logical connection 122, the logical connection 128 and the logical connection 129.

The debugger 208 selects (step 810) the logical connection 122 and then determines (step 902) whether a breakpoint has been placed on the selected logical connection 122. It has been stated hereinbefore that a breakpoint has been placed on the logical connection 122. The debugger 208 may query the runtime 206 to determine (step 904) whether an indication of the logical connection 122 is present in the stack associated with the out terminal of the comp node A#comp 306. The runtime 206 may then check the stack and report back to the debugger 208. If it is determined (step 904) that an indication of the logical connection 122 is present in the stack, as is the case wherein the physical connection 322 has been previously executed, the debugger 208 may take no action beyond determining (step 814) that there are further logical connections to consider.

The debugger 208 may then select (step 810) and proceed to analyze (step 812) the logical connection 128. The debugger 208 may then recognize (step 902) that a breakpoint has been placed on the logical connection 128. The debugger 208 may query the runtime 206 to determine (step 904) whether an indication of the logical connection 128 is present in the stack associated with the out terminal of the node comp node A#comp 306. The runtime 206 may check the stack and report back to the debugger 208. If it is determined that an indication of the logical connection 128 is not present in the stack, the debugger 208 may instruct the runtime 206 to push such an indication into the stack (step 906). As it may then be determined (step 908) that execution is not paused, the debugger 208 may instruct the runtime 206 to pause execution (step 910).

When a command is received (step 912) from the user by the debugger 208 to resume execution, the debugger 208 may select (step 810) and proceed to analyze (step 812) the logical connection 129. The debugger 208 may then recognize (step 902) that a breakpoint has not been placed on the logical connection 129. Further, the debugger 208 may determine (step 814) that there are no more logical connections to consider. It is then determined that the flow is paused (step 816). Consequently, the runtime 206 is instructed to resume execution (step 818) and control returns to the receipt of event notifications from the runtime 206 (step 802). Responsive to the resume instruction, the runtime 206 executes the physical connection and thereby progresses to the filter node A#b1.B#c2.C#filter 312.

The logical connection analysis method of FIG. 9 may be applied to any type of nested flow, including nested flows that contain loops. As described thus far, a breakpoint placed on a logical connection in a user defined flow in a loop would only cause the execution to pause on the first iteration of the loop. Indeed, in each subsequent iteration, the runtime would find an indication of the logical connection in a stack associated with a terminal and fail to pause the execution. Therefore, when a loop path exists in an optimized flow, the runtime 206 may construct a new stack in the memory 210 for every terminal in the loop path for each iteration of the loop, so that the action of pausing on breakpoints in the loop path will not be adversely influenced by the stack maintenance method.

Figure 10:
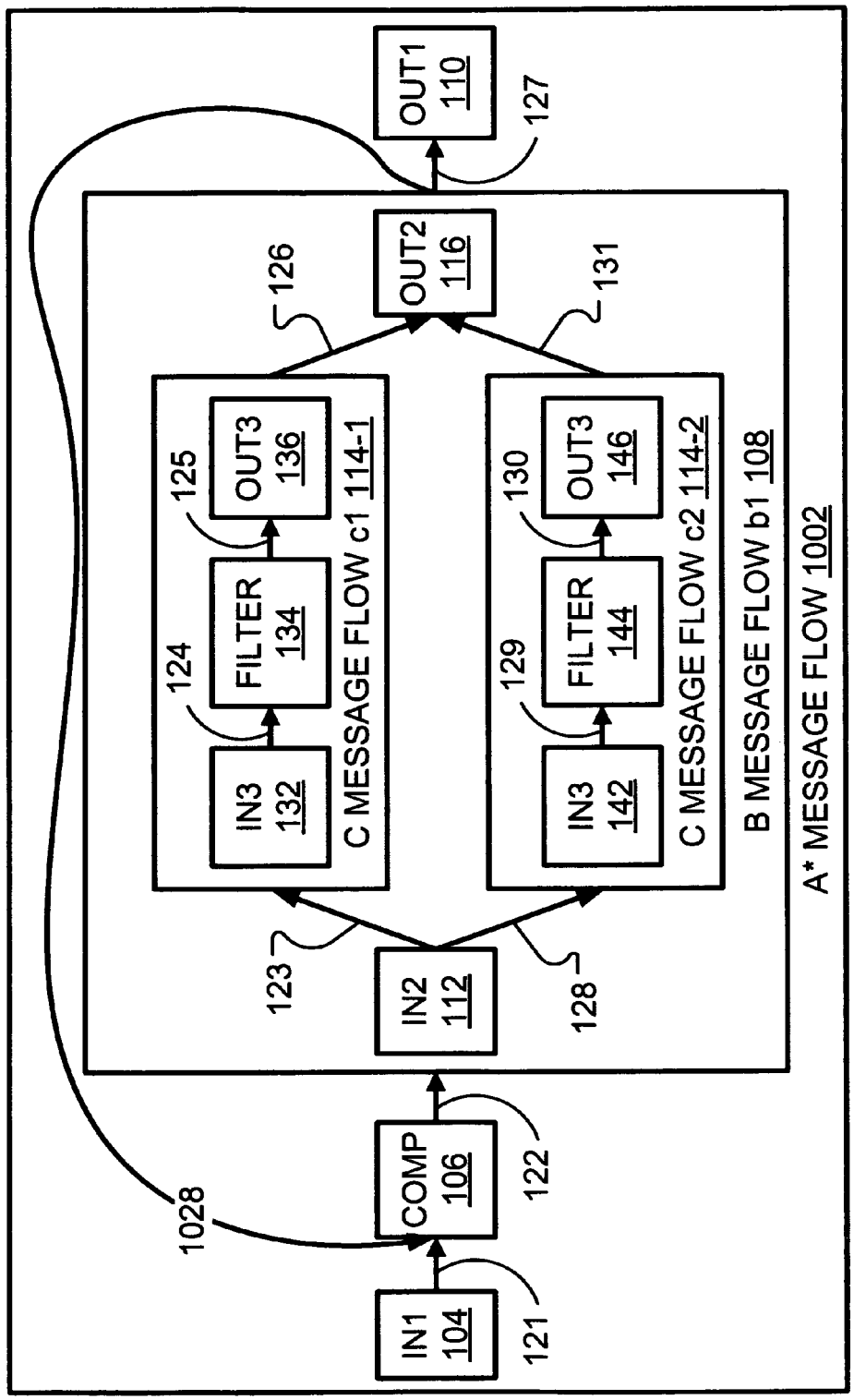
FIG. 10 illustrates an altered version of the exemplary user defined flow of FIG. 1.

For example, FIG. 10 illustrates an altered version 1000 of the exemplary user defined flow 100 of FIG. 1. An A* nested message flow 1002 contains the B message flow b1 108, which contains the two instances of the C message flow, namely c1 114-1 and c2 114-2. In the altered flow 1000, a loop path logical connection 1028 connects the out terminal of the B message flow to the in terminal of the comp node 106.

Figure 11:
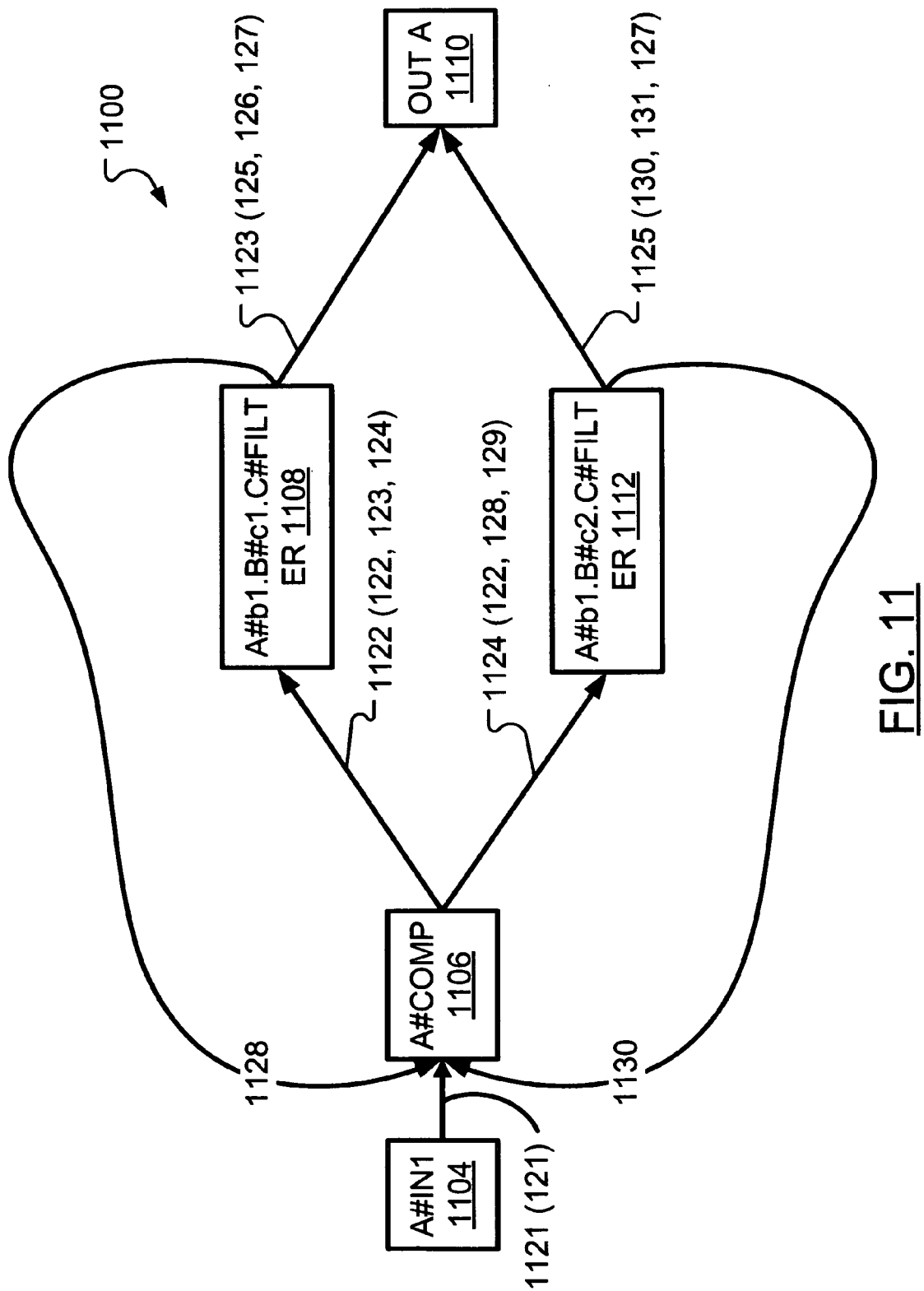
FIG. 11 illustrates an exemplary optimized flow corresponding to the flow of FIG. 10.

FIG. 11 illustrates an optimized version 1100 of the altered flow 1000 of FIG. 10. In the optimized flow 1100, a first loop path physical connection 1128 corresponds to the logical connection 125 between the first filter 134 and the first output node Out3 136, the logical connection 126 between the first output node Out3 136 and the output node Out2 116 and the loop path logical connection 1028 between the output node Out2 116 and the comp node 106. Additionally, a second loop path physical connection 1130 corresponds to the logical connection 130 between the second filter 144 and the second output node Out3 146, the logical connection 131 between the second output node Out3 146 and the output node Out2 116 and the loop path logical connection 1028 between the output node Out2 116 and the comp node 106.

Due to the nature of loops, where a breakpoint is placed on the logical connection 1122, execution is required to be paused for each iteration. It may be arranged that the runtime 206 constructs a new stack for the output terminal of the comp node A#comp 1106 every time the comp node A#comp 1106 is executed. Consequently, for each iteration, the logical connection 1122 is not in the new stack and communication between the debugger 208 and the runtime 206 may appropriately cause the execution to be paused.

Advantageously, the above measures allow the optimized flow to be executed while the user observes progress of execution on the corresponding user defined flow. Potential pitfalls of such an approach that may have led to confusion for the user are avoided through the use of a stack for maintaining information regarding the connections on which breakpoints has been placed.

Other modifications will be apparent to those skilled in the art and, therefore, the invention is defined in the claims.

We claim:

1. A method of debugging a user defined flow of a program by executing an optimized flow derived from the user defined flow, each of said optimized flow and said user defined flow comprising a plurality of nodes connected by a plurality of connections, said method comprising:
   constructing a stack associated with a terminal of a given node of said plurality of nodes in said optimized flow, said stack being tangibly embodied on a storage-type computer readable medium, said terminal connecting to a given optimized flow connection of said plurality of connections in said optimized flow, where said given optimized flow connection is associated with at least one user flow connection of said plurality of connections in said user defined flow;
   reporting imminent execution of said given optimized flow connection;
   receiving an instruction to push an indication of a particular user flow connection, among said at least one user flow connection associated with said given optimized flow connection, into said stack, the indication enabling the user to debug the user defined flow; and
   responsive to receiving said instruction to push, push said indication of said particular user flow connection into said stack such that the user can debug the program code using the indication.

2. The method of claim 1 further comprising:
   receiving an instruction to delay said execution of said given optimized flow connection; and
   responsive to receiving said instruction to delay, delaying said execution of said given optimized flow connection pending receipt of a corresponding resume instruction.

3. The method of claim 1 further comprising:
   receiving an instruction to resume said execution of said given optimized flow connection; and
   responsive to receiving said instruction to resume, resuming said execution of said given optimized flow connection.

4. The method of claim 1 further comprising constructing a new stack associated with said terminal of said given node for each iteration of a loop.

5. A runtime for executing an optimized flow that is derived from a user defined flow, the execution of the optimized flow being used by a user to debug the user defined flow, each of said optimized flow and said user defined flow comprising a plurality of nodes connected by a plurality of connections, said runtime operable to:
   construct a stack associated with a terminal of a given node of said plurality of nodes in said optimized flow, said stack being tangibly embodied on a storage-type computer readable medium, said terminal connecting to a given optimized flow connection of said plurality of connections in said optimized flow, where said given optimized flow connection is associated with at least one user flow connection of said plurality of connections in said user defined flow;
   report imminent execution of said given optimized flow connection;
   receive an instruction to push an indication of a particular user flow connection, among said at least one user flow connection associated with said given optimized flow connection, into said stack, the indication enabling the user to debug the user defined flow; and
   push said indication of said particular user flow connection into said stack so that the user can debug the user defined flow.

6. A computer readable medium containing computer-executable instructions which, when performed by a processor in a computer system for executing an optimized flow that is derived from a user defined flow, that is used to debug the user defined flow, each of said optimized flow and said user defined flow comprising a plurality of nodes connected by a plurality of connections, cause said computer system to:
   construct a stack associated with a terminal of a given node of said plurality of nodes in said optimized flow, said stack being tangibly embodied on a storage-type computer readable medium, said terminal connecting to a given optimized flow connection of said plurality of connections in said optimized flow, where said given optimized flow connection is associated with at least one user flow connection of said plurality of connections in said user defined flow;
   report imminent execution of said given optimized flow connection;
   receive an instruction to push an indication of a particular user flow connection, among said at least one user flow connection associated with said given optimized flow connection, into said stack, the indication enabling the user to debug the user defined flow; and
   push said indication of said particular user flow connection into said stack so that the user can debug the user defined flow.

7. A debugger for debugging a user defined flow that has been compiled into an optimized flow, each of said optimized flow and said user defined flow comprising a plurality of nodes connected by a plurality of connections, said debugger operable to:
   receive a report, from a runtime, of imminent execution of a given optimized flow connection of said plurality of connections in said optimized flow;
   query said runtime to identify at least one user flow connection of said plurality of connections in said user defined flow associated with said given optimized flow connection;

determine whether a breakpoint has been placed on a first user flow connection of said at least one user flow connection in said user defined flow;

in response to determining whether a breakpoint has been placed, determine whether an indication of said first user flow connection exists in a stack associated with a terminal of a given node of said plurality of nodes in said optimized flow, said stack being tangibly embodied on a storage-type computer readable medium, said terminal connecting to said given optimized flow connection; and in response to determining whether an indication of said first user flow connection, instruct said runtime to push an indication of said first user flow connection into said stack.

8. A computer readable medium containing computer-executable instructions that, when performed by a processor in a computer system for debugging a user defined flow that has been compiled into an optimized flow, each of said optimized flow and said user defined flow comprising a plurality of nodes connected by a plurality of connections, cause said computer system to:

receive a report, from a runtime, of imminent execution of a given optimized flow connection of said plurality of connections in said optimized flow;

query said runtime to identify at least one user flow connection of said plurality of connections in said user defined flow associated with said given optimized flow connection;

determine whether a breakpoint has been placed on a first user flow connection of said at least one user flow connection in said user defined flow;

in response to determining whether a breakpoint has been placed, determine whether an indication of said first user flow connection exists in a stack associated with a terminal of a given node of said plurality of nodes in said optimized flow, said stack being tangibly embodied on a storage-type computer readable medium, said terminal connecting to said given optimized flow connection; and in response to determining whether an indication of said first user flow connection, instruct said runtime to push an indication of said first user flow connection into said stack.

9. A method of debugging a program code, the program code including at least one node having a breakpoint and a variable, the breakpoint for allowing a user to use a value of the variable to debug the program code, the method comprising:

generating an optimized flow from the program code, the generated optimized flow having at least two optimized nodes derived from the one node having the breakpoint;

executing the optimized code;

ensuring that two values of the variable are stored during execution of the optimized code, each one of the values being stored when one of the at least two optimized nodes is traversed; and debugging the program code using the two stored values of the variable.

10. The method of claim 9 wherein the at least two optimized nodes are derived from the one node having the breakpoint when there is a loop in the program code that includes at least a first and second branches of code such that during a first iteration of the loop the first branch of code is traversed and during a second iteration of the loop the second branch of code is traversed and the node having the breakpoint is traversed at both the first and second iterations of the loop.

11. A computer program product on a storage-type computer readable medium for allowing a user to debug a program code, the program code including at least one node having a breakpoint and a variable, the breakpoint for allowing a user to use a value of the variable to debug the program code, the computer program product comprising:

code means for generating an optimized flow from the program code, the generated optimized flow having at least two optimized nodes derived from the one node having the breakpoint;

code means for executing the optimized code;

code means for ensuring that two values of the variable are stored during execution of the optimized code, each one of the values being stored when one of the at least two optimized nodes is traversed thereby allowing the user to debug the program code using the stored values of the variable.

12. The computer program product of claim 11 wherein the at least two optimized nodes are derived from the one node having the breakpoint when there is a loop in the program code that includes at least a first and second branches of code such that during a first iteration of the loop the first branch of code is traversed and during a second iteration of the loop the second branch of code is traversed and the node having the breakpoint is traversed at both the first and second iterations of the loop.

13. A computer system being used to debug a program code, the program code including at least one node having a breakpoint and a variable, the breakpoint for allowing a user to use a value of the variable to debug the program code, the computer system comprising:

a storage device to store code data; and a processor for processing the code data to generate an optimized flow from the program code, the generated optimized flow having at least two optimized nodes derived from the one node having the breakpoint, to execute the optimized code, to ensure that two values of the variable are stored during execution of the optimized code, each one of the values being stored when one of the at least two optimized nodes is traversed, the two stored values of the variable enabling the user to debug the program code.

14. The computer system of claim 13 wherein the at least two optimized nodes are derived from the one node having the breakpoint when there is a loop in the program code that includes at least a first and second branches of code such that during a first iteration of the loop the first branch of code is traversed and during a second iteration of the loop the second branch of code is traversed and the node having the breakpoint is traversed at both the first and second iterations of the loop.

* * * * *